US007278389B2

(12) United States Patent
Kirakosyan

(10) Patent No.: US 7,278,389 B2
(45) Date of Patent: Oct. 9, 2007

(54) AUTOMOBILE INTAKE AIR FLOW PLENUM AND PLENUM DIVERTER

(76) Inventor: Murat Kirakosyan, 15989 E. Altos Dr., Hacienda Heights, CA (US) 91745

( * ) Notice: Subject to any disclaimer, the term of this patent is extended or adjusted under 35 U.S.C. 154(b) by 18 days.

(21) Appl. No.: 11/110,258

(22) Filed: Apr. 19, 2005

(65) Prior Publication Data

US 2006/0231081 A1 Oct. 19, 2006

(51) Int. Cl.
*B01D 35/30* (2006.01)

(52) U.S. Cl. .................................................. 123/184.53

(58) Field of Classification Search ................ 123/590, 123/184.53, 184.47

See application file for complete search history.

(56) References Cited

U.S. PATENT DOCUMENTS

| | | | | |
|---|---|---|---|---|
| 1,584,046 A | | 5/1926 | Smith | |
| 2,966,150 A | | 12/1960 | Wiltshire et al. | |
| 3,930,485 A | * | 1/1976 | Konomi | 123/590 |
| 4,015,574 A | | 4/1977 | Hanff | |
| 4,099,503 A | * | 7/1978 | Casey | 123/590 |
| 4,099,504 A | * | 7/1978 | Bickhaus | 123/547 |
| 4,109,619 A | * | 8/1978 | Morris | 123/184.56 |
| 4,210,107 A | | 7/1980 | Shaffer | |
| 4,274,386 A | | 6/1981 | Reyes | |
| 4,463,742 A | | 8/1984 | Williams | |
| 4,474,163 A | | 10/1984 | Linder et al. | |
| 4,520,786 A | * | 6/1985 | Thatcher et al. | 123/536 |
| 4,690,107 A | | 9/1987 | Emler et al. | |
| 4,909,222 A | * | 3/1990 | Takano et al. | 123/470 |
| 4,962,642 A | | 10/1990 | Kim | |
| 4,977,866 A | * | 12/1990 | Wilkins | 123/184.34 |
| 5,076,218 A | * | 12/1991 | Graziadei | 123/184.39 |
| 5,619,960 A | | 4/1997 | Funk | |
| 6,251,151 B1 | * | 6/2001 | Kobayashi et al. | 55/309 |
| 6,752,124 B1 | | 6/2004 | Chang | |
| 6,776,146 B1 | | 8/2004 | Ricart-Ugaz et al. | |
| 6,776,400 B1 | | 8/2004 | Laneuville | |
| 6,796,296 B2 | | 9/2004 | Kim | |

* cited by examiner

*Primary Examiner*—Willis R. Wolfe
*Assistant Examiner*—Jason Benton
(74) *Attorney, Agent, or Firm*—Buhler & Associates; Kirk A. Buhler

(57) ABSTRACT

An airflow diverter and replacement air intake plenum is disclosed that provides an increase in the air speed and airflow within the intake plenum of an automobile. The increase is the result of providing appropriately sized and shaped apparatus to smooth out the airflow within the plenum and eliminate turbulence that increase pressure within the plenum and cause a restriction of air movement. The diverter is configured in a triangular shape to divert the air from a single input port into two output ports. The apparatus is ideally configured for use in a Porsche, but can be configured for other automobiles and engines.

20 Claims, 5 Drawing Sheets

AUTOMOBILE INTAKE AIR FLOW PLENUM AND PLENUM DIVERTER

FIELD OF THE INVENTION

This invention relates to an automobile plenum airflow diverter. More particularly, the present invention relates a specifically sized and shaped apparatus that can be placed within the plenum of the intake manifold of an automobile to improve the air flow within the plenum this increases the air speed and air flow within the plenum. A replacement plenum is also disclosed that provides similar function that can be achieved by replacing a stock plenum. Even more specifically the apparatus is intended for the intake air plenum of a Porsche.

BACKGROUND OF THE INVENTION

For as long as gasoline powered motors have been around the need to increase the efficiency of these motors has been an issue. Many people and companies have spent money on the research and development on the design of products with the specific intent to improve fuel economy. One of the main areas to improve fuel economy is with the delivery of air to the combustion chamber. The more efficiently the air and or fuel can be delivered into the combustion chamber the more complete the burn, the higher the horsepower and ultimately the more efficient the engine. A number of patents have been issued that address changing how the air flows into the throttle body, through the plenum and into the cylinders of the engine.

One method of changing or adjusting the airflow through the plenum is covered in U.S. Pat. Nos. 4,210,107 and 4,977,866 issued to Shaffer and Wilkins respectively. These patents disclose using an adjustment plates or walls placed within the plenum of an engine. The location of the plates within the plenum can be externally adjusted to move the plates within the plenum whereby tuning the airflow as it passes through the plenum. While these devices allow the airflow through the plenum to be adjusted, they require manual adjustment to the plates within the plenum, are expensive to install, and include and adjustment component that allows for maladjustment of the plates or walls.

Another method of changing or adjusting the airflow through the plenum is covered in U.S. Pat. Nos. 6,776,146 and 6,776,400 issued to Ricart-Ugaz et al and Laneuvill respectively, these disclose the use of a flow obstructer that is placed in the path of air that enters the top of the carburetor or throttle body. These devices disturb the air entering the throat of the throttle body to create turbulent airflow. They further obstruct a portion of the air entering the throttle body and create a change in the flow of air into the engine. While they provide a diversion of the air entering the engine, the air flow entering the throttle body may be turbulent airflow. Placing these devices within the throttle body create pressure changes that may slow down the air as it enters the plenum.

A number of other patents disclose placing turbulent or swirling obstruction on top of the carburetor, throttle or within the plenum. These devices are disclosed in U.S. Pat. No. 4,015,574 issued to Hanff, U.S. Pat. No. 4,274,386 issued to Reyes, U.S. Pat. No. 4,463,742 issued to Williams, U.S. Pat. No. 4,474,163 issued to Linder et al, U.S. Pat. No. 4,962,642 issued to Kim, U.S. Pat. No. 6,752,124 issued to Chang and U.S. Pat. No. 6,796,296 issued to Kim. All these products introduce an obstructer into the airflow with an attempt to better mix the air and fuel. In the process of creating turbulent flow they also restrict the amount of air entering the engine and cause pressure changes with the plenum.

What is needed is a simple to install product that can be placed within a standard factory plenum or can replace a factory plenum that will smooth out the airflow within the plenum and allow more air to enter the engine and increase the horsepower from the engine. The proposed plenum airflow diverter provides this solution by providing simple component that can be placed within the plenum of a vehicle or where the plenum can be replaced to provide the features disclosed in this application. The proposed device satisfies these needs.

BRIEF SUMMARY OF THE INVENTION

It is an object of the present plenum diverter is to provide a component that can be placed within a plenum to increase the airspeed and airflow through the plenum.

The present plenum diverter provides these features in a number of manners. One component can be placed in a “T” shaped plenum and diverts the airflow onto the plenum to be smoothly diverted into the output ports of the plenum. The shape of this components approximates the size and shape of the input and output ports of the plenum to reduce obstructions that can cause the air to slow down. The result of the components allows the standard “T” shaped plenum to operate more like a “Y” shaped plenum.

Another object of the plenum diverter insert is to provide the insert in both symmetric and non-symmetric shapes based upon the plenum where the insert is being used. These two or more variations allow a plethora of options to allow for variations that can accommodate a number of different shaped plenums.

A further object of the plenum diverter is to provide a replacement plenum that can be easily used to replace a “T” shaped plum and provide an increase in the airflow and air speed of the air through the plenum.

It is further an object of the plenum diverter to provide a plenum diverter that can accommodate the same, larger or various sizes of throttle bodies. If a larger throttle body is used with the plenum diverter a larger amount of air can enter the throttle body, the plenum and ultimately the engine. This will all result in higher air speed, higher airflow, greater horsepower and better fuel economy.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
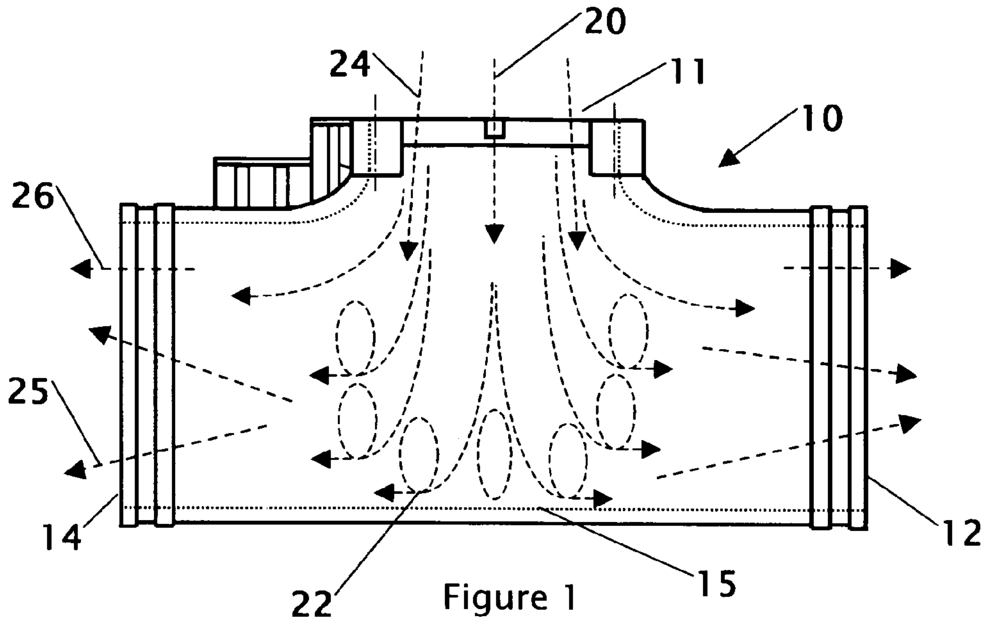
Figure 1 Prior Art
FIG. 1 is a side view of prior art plenum that is currently being used.

Referring to FIG. 1 there is shown side view of prior art plenum 10 that is currently being used. In this view a single the intake port 11 is shown where air 20 is brought into the plenum. The air exits the plenum through two exit ports 12 and 14. Due to the "T" shape of the plenum some air that enters in the center of the input port will bounce off the far wall of the Plenum 115 and will cause some of the air to swirl or be turbulent as shown by item 22. This air may exit the plenum 25 in a turbulent manner and slow the airflow through the plenum. Air that enters near the sides of the plenum 24 may make a smoother transition 26 to the output port(s).

Figure 12:
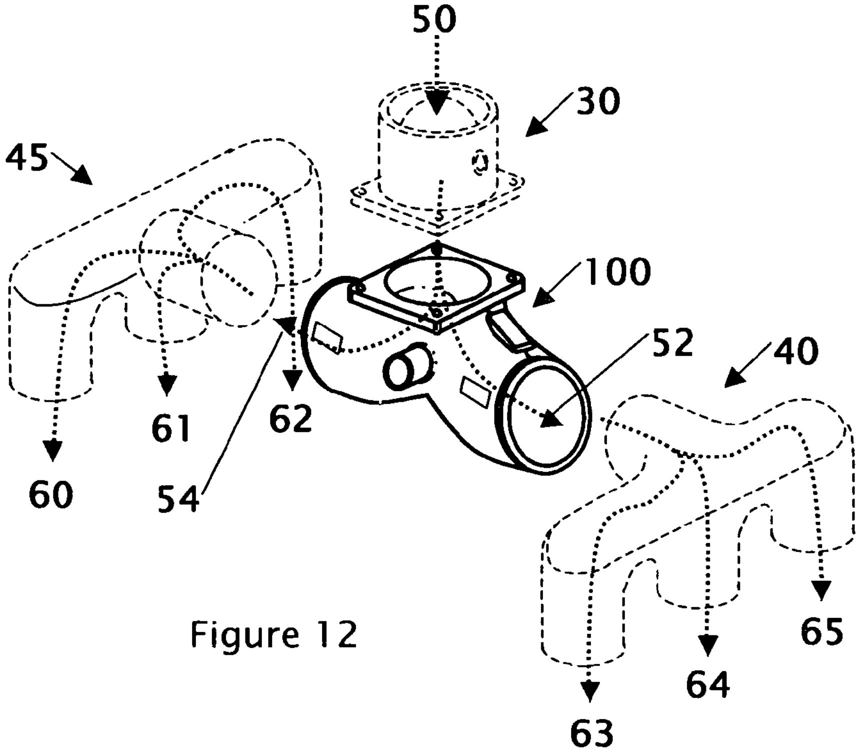
FIG. 12 is an isometric view of the replacement plenum showing the location of the replacement plenum in the intake manifold.

To get a better understanding regarding where the plenum exists in an automobile, refer to FIG. 12 that shows an isometric view of the plenum 100 showing the location of the plenum in the intake manifold system. The plenum 100 is positioned between a throttle body 30 and intake manifolds or headers 40 and 45. Air 50 enters the throttle body 30 after it is filtered. The throttle body 30 regulates the amount of air that is brought in to the throttle body using a simple flap valve, butterfly valve or similar regulating mechanism. The air 50 flows through the throttle boy and enters the plenum and then exits the plenum 52 and 54 where the air is sent into the intake manifolds or headers 40 and 45. From within the headers the air is sent into each of the cylinders 60 to 65 of the engine. This figure shown the plenum with a single intake and air flow being diverted into a six separate cylinders, but an engine with as little as two or more than two cylinders is contemplated.

Figure 2:
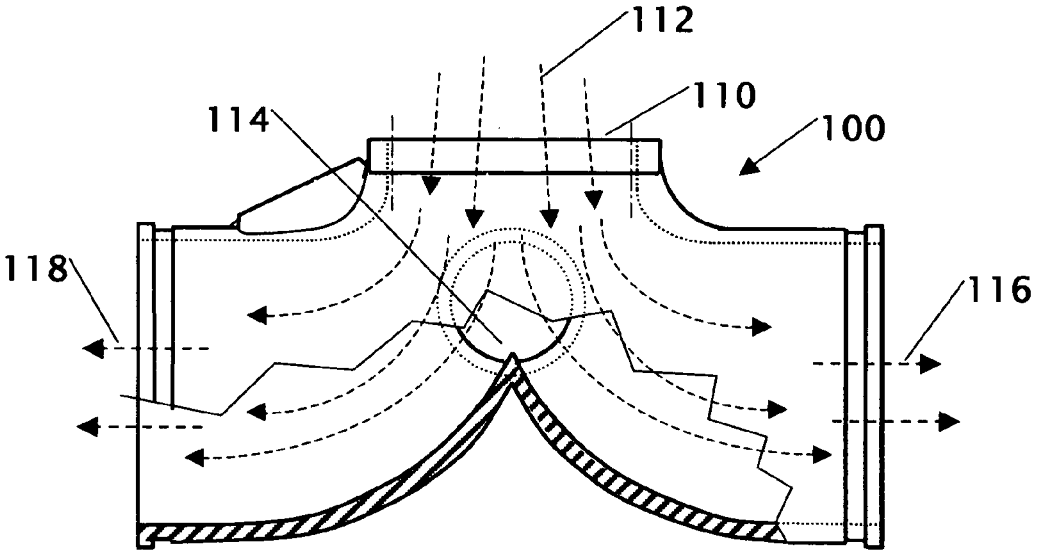
FIG. 2 is a side view of the replacement plenum.

FIG. 2 is a side view of the replacement plenum. The plenum 100 in this figure is used in place of the standard plenum to provide superior air speed and airflow. From this view the airflow 112 is shown entering the input port 110. As the air flows into the plenum the airflow is split with the apex of the diverter 114. The apex is essentially a horizontal detail within the plenum that divides the airflow into to directions. The two separate air paths exit the plenum at 116 and 118. The splitting of the airflow allows the stream of air to smoothly exit out of the plenum with a minimal disturbance and turbulence. The isometric view in FIG. 3 shows the appropriate size and shape of the replacement plenum and provides additional information regarding the unique attributes of the plenum.

Figure 3:
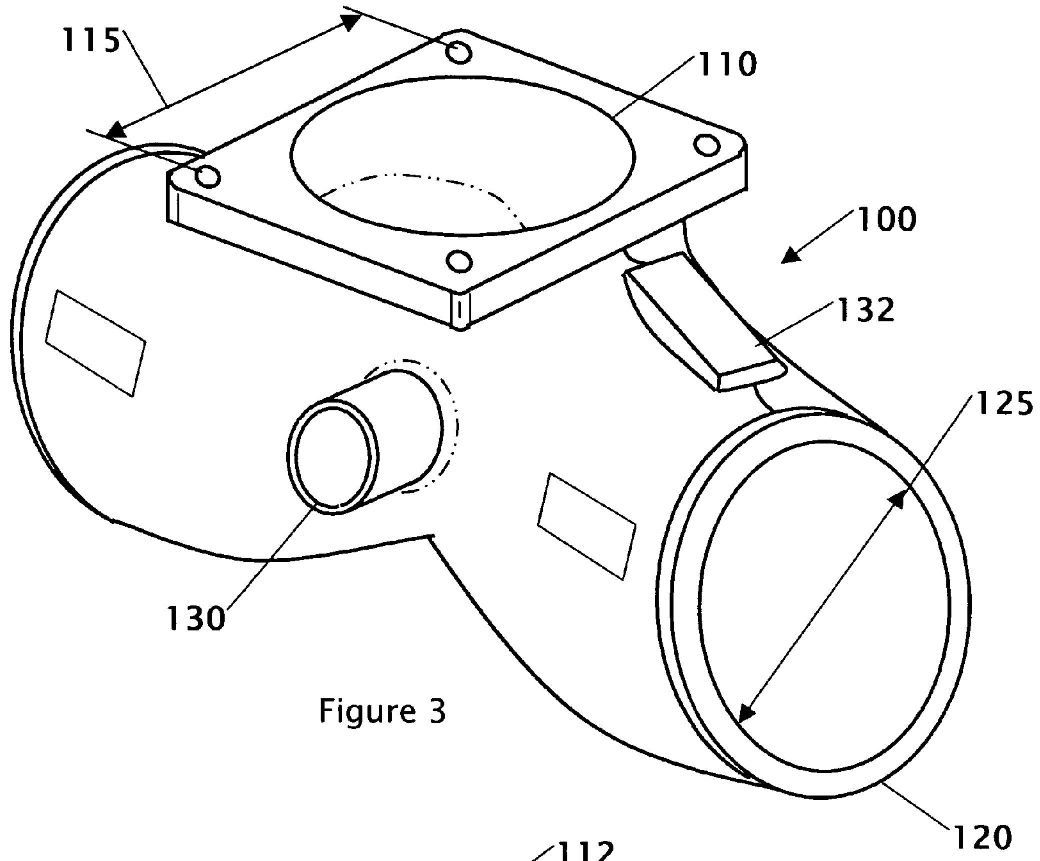
FIG. 3 is an isometric view of the replacement plenum.

FIG. 3 is an isometric view of the replacement plenum 100 where an inverted "T" shaped plenum is replaced with an inverted "Y" shaped plenum. The input port 110 is designed to accept a larger size 115 throttle body of 85 mm, while the standard plenum as shown in FIG. 1, is designed for a 80 mm throttle valve. The larger throttle body allows a greater volume of air to enter the input port 110 of the plenum. The larger throttle body is an optional feature of the plenum diverter, but a variety of different size throttle bodies are contemplated including producing the replacement plenum with a variety of mounting holes or providing slots to allow for a variety of throttle bodies that can be changed without requiring the plenum to be replaced. In the preferred embodiment the output port(s) 120 are the same size 125 as original throttle body, but the plenum could be fabricated with output ports that are different in size than was used in the original equipment on the vehicle. The size of the output port on the original plenum is between 70 mm and 90 mm but can vary based upon the vehicle the replacement plenum is being installed into. While the preferred uses the dimensions disclosed, the inlet and outlet dimensions of the plenum can vary based upon the connections that are available on the vehicle. The replacement plenum includes the similar air, sensor and breather ports that are present on the original plenum installed on the vehicle. The locations of these ports are shown as item 130, and 132, but could be located in other places on the plenum. In the embodiment shown in FIG. 3 the plenum is completely replaced. Other embodiments are shown in FIGS. 4 to 10 where the plenum is not replaced, but a diverter is placed in the original factory plenum to accomplish a similar results.

In the preferred embodiment the replacement plenum is made from a metallic casting, but the replacement plenum can be made from any material that provides the desired function. The material may include but not be limited to plastics, metals or a combination thereof.

Figure 4:
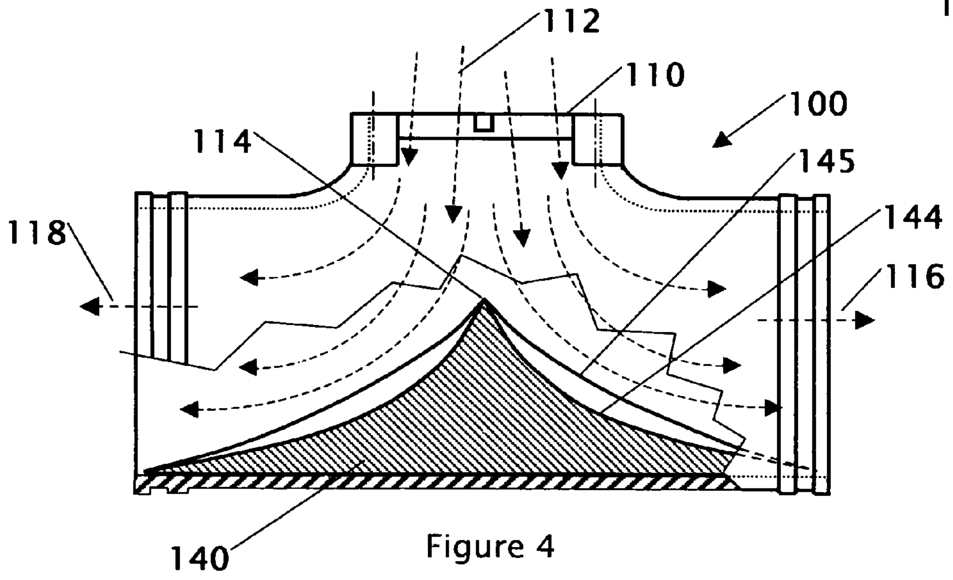
FIG. 4 is a side cross sectional view of the plenum diverter insert placed inside the plenum shown in FIG. 1.
Figure 5:
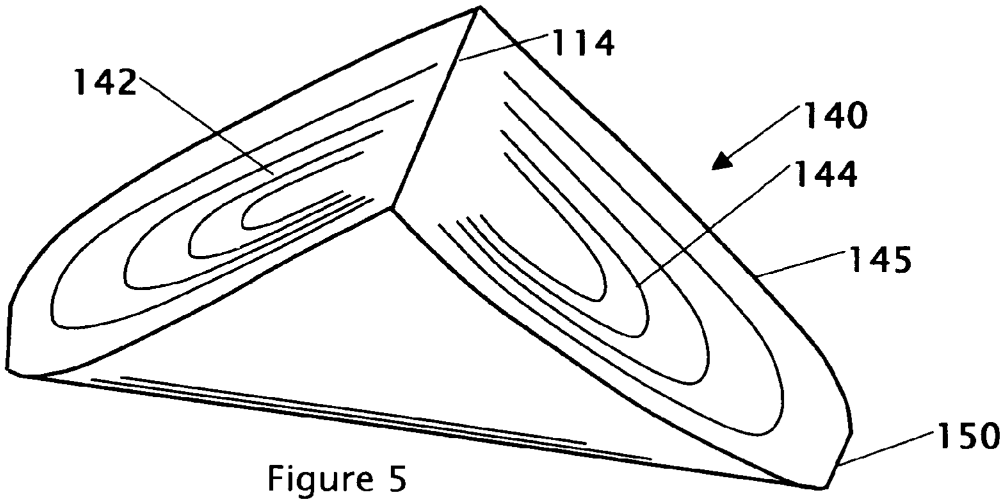
FIG. 5 is an isometric view of the insert plenum diverter from FIG. 4.
Figure 6:
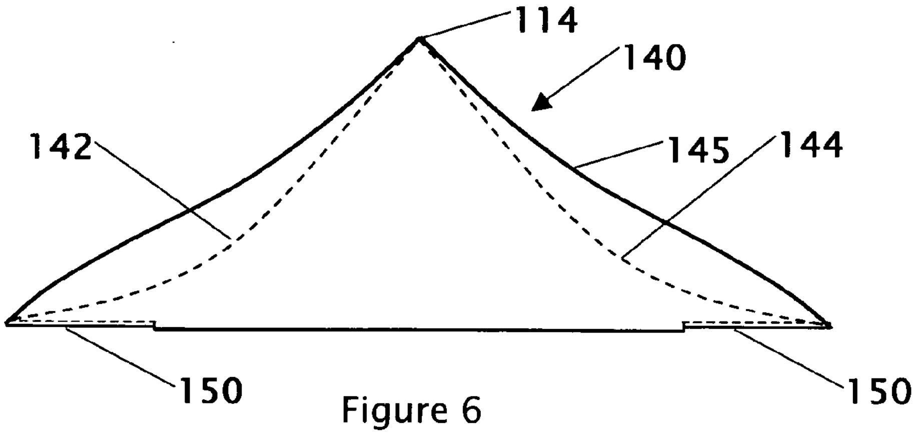
FIG. 6 is a side view of the insert plenum diverter from claim 4 showing the insert plenum diverter as symmetric.
Figure 7:
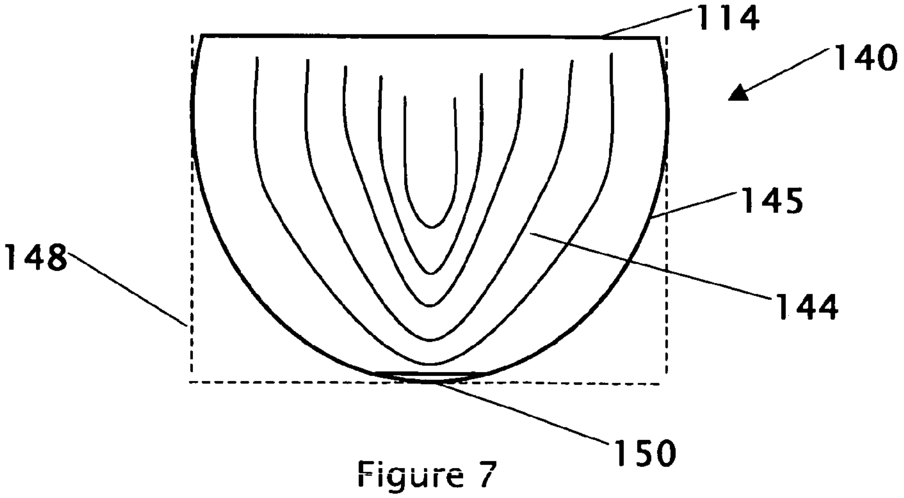
FIG. 7 is a front view of the insert plenum diverter from claim 4.

FIG. 4 is a side cross sectional view of the plenum diverter insert 140 placed inside the plenum 100 shown in FIG. 1. The insert is a triangular shaped apparatus that can be placed within a standard plenum to accomplish similar results that can be achieved from the replacement plenum disclosed previously. In this figure the airflow 112 is shown entering the input port 110. The air flowing into the plenum is split into two different directions by the apex 114 of the insert where the air stream exits the output ports of the plenum 116 and 118. FIGS. 5, 6 and 7 show various views of the diverter that can be placed into the plenum. These figures provide greater clarity of the design of the diverter. FIGS. 5, 6 and 7 show the apex 114 of the diverter as essentially a straight surface the air stream flows onto and is split into two directions. The outside profile 145 of the diverter is appropriately designed to fit within the plenum without requiring modification of the plenum. The diverter is designed to approximate the cross section of the plenum, and areas 142 and 144 are semi-circular features that accomplish this design objective. The triangular shape starts at the apex and tapers down on the two ends to smooth the airflow out of the plenum. Recess(s) 150 is shown on the underside of the diverter to allow the diverter to be bonded into an existing plenum. Alternately, it is contemplated, that the diverter be screwed or fastened within the plenum using a variety of fastening means.

FIG. 7 shows that the profile of the diverter is circular to match the internal profile of the plenum. Dashed line 148 shown that the profile of the diverter could also be square or rectangular to match the profile of a different shaped plenum or manifold.

Figure 8:
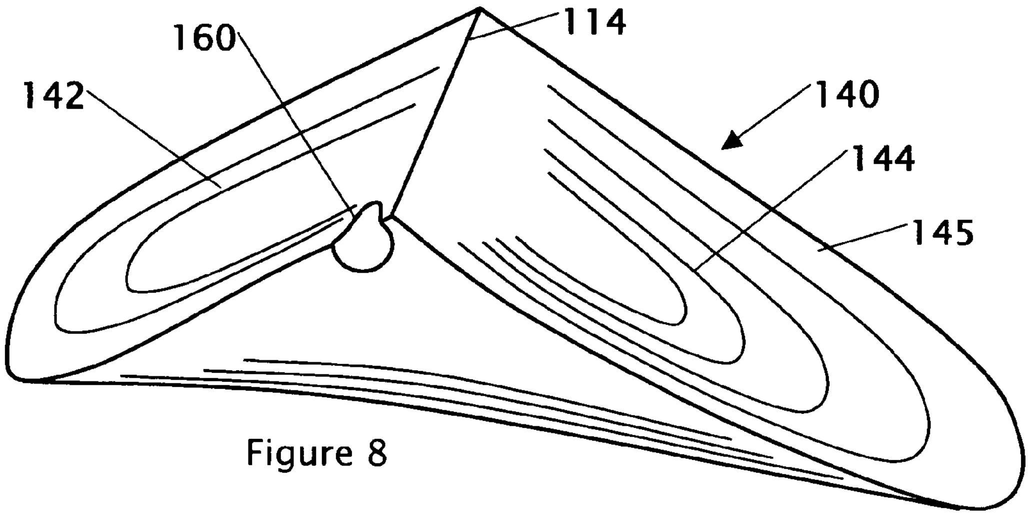
FIG. 8 is an isometric view of a non-symmetric insert plenum diverter.
Figure 9:
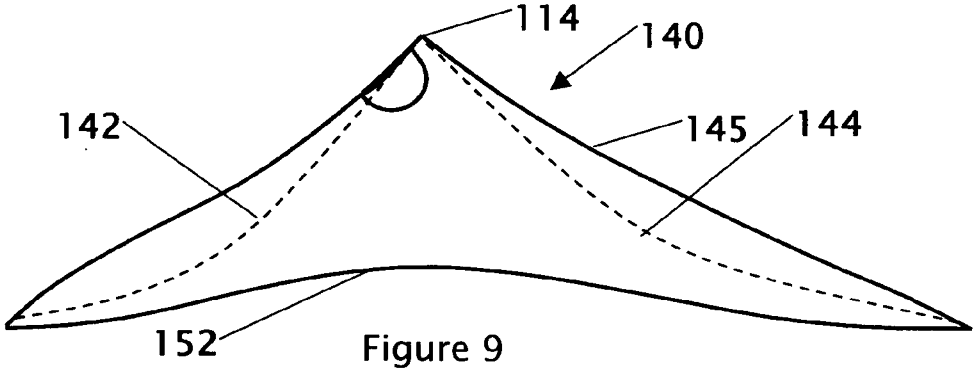
FIG. 9 is a side view of the insert plenum diverter from claim 8.
Figure 10:
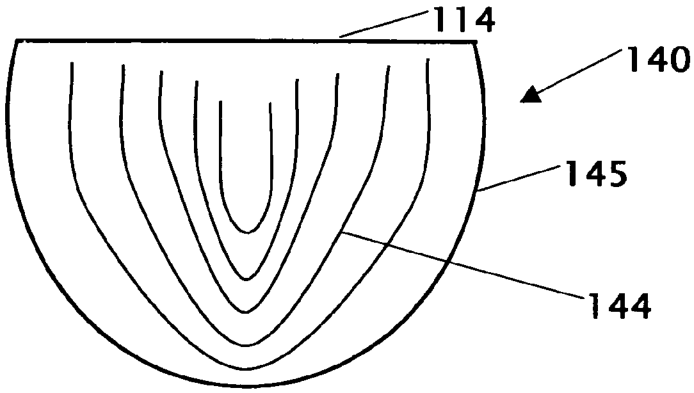
FIG. 10 is a front view of the insert plenum diverter from claim 8.

FIGS. 8 to 10 shows an alternate embodiment of the flow diverter where the diverter is not symmetrically shaped on both sides of the apex 114. These figures also show a circular notch 160 on one side of the diverter that allows for the circulation of air to sensor or other parts of the vehicle that may be required based upon the plenum that is installed within the vehicle. A concave recess 152 is shown on the underside of the diverter to allow the diverter to be bonded into an existing plenum. In the preferred embodiment the diverter is made from a heat resistant plastic material, but the diverter can be made from any material that provides the desired function. The material may include but not be limited to plastics, metals or a combination thereof. FIG. 9 shows the underside of the diverter is concave to allow for placement of a bonding agent to attach the diverter into the plenum.

Figure 11:
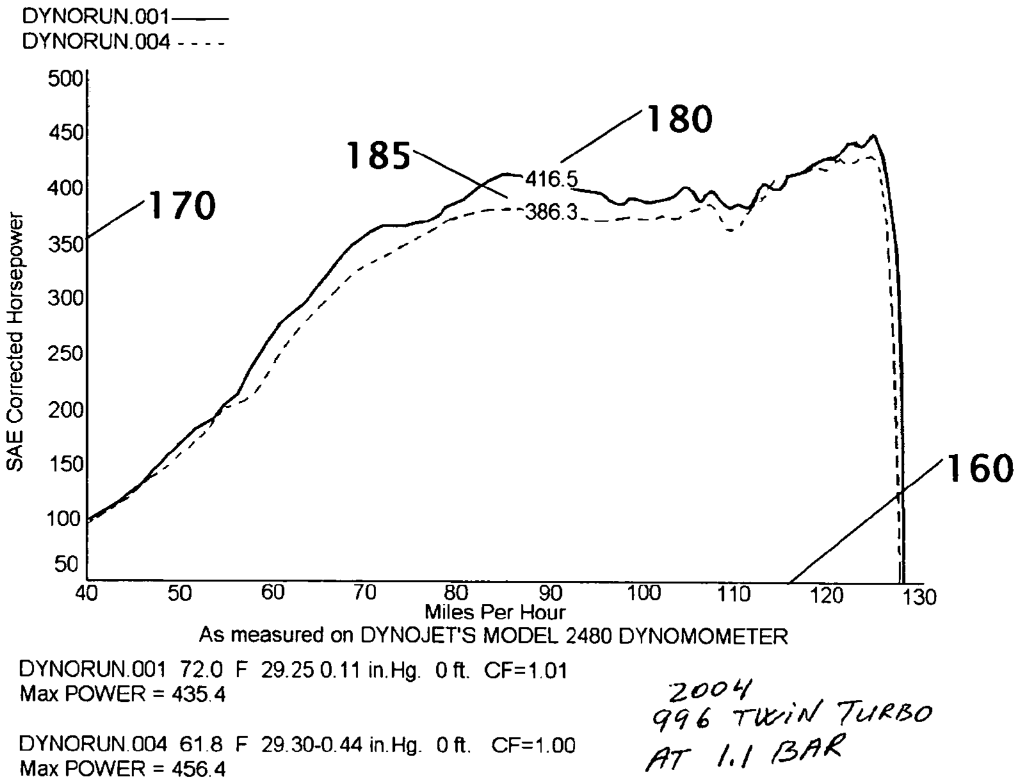
FIG. 11 is a graph showing the change in horsepower from an engine before and after using the replacement plenum from FIG. 2

FIG. 11 is a graph showing the change in horsepower from an engine before and after using the replacement plenum from FIG. 2. The X-axis of this graph shows the speed of the vehicle in Miles Per Hour, while the Y-axis shows the Horsepower of the vehicle. Two plots on the graph show the horsepower at the various speeds. The dashed line 185 shows that at a given speed the replacement plenum used 386.3 horsepower, while at the same speed the standard plenum used 416.5 horsepower. This graph is an example of the improvement that is achieved with the replacement plenum and or the diverter. These tests were measured using a Dynojet Model 2480 Dynamometer.

The air diverter(s) and replacement plenum is optimally designed for use in the six-cylinder motor that is used in a Porsche, but the air diverter and replacement plenum can be designed for use in a variety of vehicles and intake systems for other vehicles. In addition, the plenum is shown with a circular cross section for the air path, but other cross sectional air paths are contemplated including but not limited to square, rectangular, oval and others. The replacement plenum and the insert both provide a more consistent cross sectional area of the plenum that provides less restrictive and turbulent air flow, resulting in an increase of air flow rate, air speed and higher output from the engine.

Thus specific embodiments and applications for a replacement plenum and an airflow diverter plenum insert have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A flow diverter for use within a plenum comprising:

an air flow diverter specifically sized for installation within an existing "T" shaped intake manifold plenum of an automobile configured in a triangular profile to divert air directed onto a pointed apex of the diverter to smooth the air flow onto the pointed apex of the diverter to the tapered ends of the flow diverter to increase air speed and air flow the tapered sides of the flow diverter have dish shaped cross section that maintains a consistent cross sectional area from a single intake of the plenum to multiple outlet ports of the plenum.

2. The flow diverter from claim 1 wherein the side profile of the diverter is configured for use in a circular manifold.

3. The flow diverter from claim 1 wherein the side profile of the diverter is configured for use in a rectangular manifold.

4. The flow diverter from claim 1 wherein the flow diverter is made from aluminum, other types of metal or plastic.

5. The flow diverter from claim 1 wherein taper from the apex of the diverter to the base of the diverter further includes a profile to approximate the cross sectional profile of the plenum.

6. The flow diverter from claim 1 where the triangular profile can be symmetric of non-symmetric.

7. The flow diverter from claim 1 further includes a method feature to accommodate attachment of the flow diverter within an intake manifold.

8. An intake manifold plenum for a vehicle comprising: an inverted "Y" shaped air intake plenum for a vehicle located after the air filter that including a single main air intake port that ducts airflow to two opposing ports wherein the profile of the two opposing ports approximates the profile of the air intake port to increase the air speed and flow through the intake plenum where the cross sectional shape and area of the ducting from the single main air intake port to each of the two opposing ports is maintained.

9. The intake plenum from claim 8 wherein the intake plenum is made from metal or plastic.

10. The intake plenum from claim 8 wherein the plenum replaces an inverted "T" shaped plenum.

11. The intake plenum from claim 8 wherein the plenum is configured for use in a Porsche.

12. The intake plenum from claim 8 wherein the plenum allows includes mounting for a larger throttle body.

13. The intake plenum from claim 8 wherein the plenum allows mounting of various sized throttle bodies.

14. The air intake plenum from claim 8 wherein the air intake plenum reduces turbulent air flow within the plenum.

15. The two opposing ports from claim 8 wherein the two opposing ports are substantially the same size.

16. A replacement intake plenum comprising:

an intake plenum for replacement of an existing intake plenum wherein the replacement plenum provides mounting holes for a throttle body different in size than the factory throttle body;

wherein the plenum has a circular inlet that splits into a plurality of circular output parts in a "Y" shaped configuration where the cross sectional area of the circular inlet port is maintained to the plurality of circular output ports where the circular output ports mate with existing plenum ducting.

17. The replacement intake plenum from claim 16 further comprises a configuration to improve the airflow through the plenum by providing reducing turbulent airflow.

18. The replacement intake plenum from claim 16 wherein the replacement intake plenum is made from metal or plastic.

19. The replacement intake plenum from claim 16 wherein the replacement plenum is shaped as in inverted "Y" with one input port and two output ports.

20. The replacement intake plenum from claim 16 wherein the ports of the replacement intake plenum are substantially round in shape.

* * * * *

UNITED STATES PATENT AND TRADEMARK OFFICE

CERTIFICATE OF CORRECTION

PATENT NO. : 7,278,389 B2
APPLICATION NO. : 11/110258
DATED : October 9, 2007
INVENTOR(S) : Murat Kirakosyan It is certified that error appears in the above-identified patent and that said Letters Patent is hereby corrected as shown below:

IN THE SPECIFICATIONS:

In column 5 line 12, please replace:
"185 shows that at a given speed the replacement plenum"
With:
"185 shows that at a given speed the standard plenum"

In column 5 line 13, please replace:
"used 386.3 horsepower, while at the same speed the standard"
With:
"produced 386.3 horsepower, while at the same speed the replacement"

In column 5 line 14, please replace:
"plenum used 416.5 horsepower. This graph is an example of"
With:
"plenum 185 produced 416.5 horsepower. This graph is an example of"

IN THE CLAIMS:

Column 6, line 6, Claim 6, should read, The flow diverter from claim 1 where the triangular profile can be symmetric or non-symmetric.

Column 6, line 12, Claim 8, should read, An intake manifold plenum for a vehicle comprising:
an inverted "Y" shaped air intake plenum for a vehicle located after the air filter that includes a single main air intake port that ducts airflow to two opposing ports wherein the profile of the two opposing ports approximates the profile of the air intake port to increase the air speed and flow through the intake plenum where the cross sectional shape and area of the ducting from the single main air intake port to each of the two opposing ports is maintained.

Signed and Sealed this
Twentieth Day of December, 2011

David J. Kappos

David J. Kappos
*Director of the United States Patent and Trademark Office*

Column 6, line 26, Claim 12, should read, The intake plenum from claim 8 wherein the plenum allows mounting for a larger throttle body.

Column 6, line 47, Claim 17, should read, The replacement intake plenum from claim 16 further comprises a configuration to improve the airflow through the plenum by reducing turbulent airflow.

Column 6, line 52, Claim 19, should read, The replacement intake plenum from claim 16 wherein the replacement plenum is shaped as an inverted “Y” with one input port and two output ports.